(12) United States Patent
Taenzer et al.

(10) Patent No.: US 6,631,196 B1
(45) Date of Patent: Oct. 7, 2003

(54) METHOD AND DEVICE FOR USING AN ULTRASONIC CARRIER TO PROVIDE WIDE AUDIO BANDWIDTH TRANSDUCTION

(75) Inventors: Jon C. Taenzer, Los Altos, CA (US); Robert J. Higgins, Jr., Fort Lauderdale, FL (US)

(73) Assignee: GN ReSound North America Corporation, Redwood City, CA (US)

( * ) Notice: Subject to any disclaimer, the term of this patent is extended or adjusted under 35 U.S.C. 154(b) by 0 days.

(21) Appl. No.: 09/545,412

(22) Filed: Apr. 7, 2000

(51) Int. Cl.[7] ............................................... H04R 25/00
(52) U.S. Cl. ........................ 381/316; 381/312; 381/328
(58) Field of Search ................................. 381/23.1, 312, 381/315, 316, 320, 321, 326, 328; 607/55, 56, 57; 600/25

(56) References Cited

U.S. PATENT DOCUMENTS

| | | | |
|---|---|---|---|
| 3,068,954 A | * 12/1962 | Strzalkowski | ............... 381/328 |
| 4,539,440 A | 9/1985 | Sciarra | |
| 4,539,708 A | 9/1985 | Norris | |
| 4,756,312 A | 7/1988 | Epley | |
| 4,800,982 A | 1/1989 | Carlson | |
| 4,815,138 A | 3/1989 | Diethelm | |
| 4,982,434 A | 1/1991 | Lenhardt | |
| 5,047,994 A | 9/1991 | Lenhardt | |
| 5,285,499 A | 2/1994 | Shannon et al. | |
| 5,298,692 A | 3/1994 | Ikeda et al. | |
| 5,313,663 A | 5/1994 | Norris | |
| 5,420,930 A | 5/1995 | Shugart, III | |
| 5,636,285 A | 6/1997 | Sauer | |
| 5,649,019 A | 7/1997 | Thomasson | |
| 5,761,316 A | 6/1998 | Pritchard | |
| 5,889,870 A | 3/1999 | Norris | |
| 5,987,146 A | 11/1999 | Pluvinage et al. | |
| 6,169,813 B1 | * 1/2001 | Richardson et al. | ........ 381/316 |
| 6,173,062 B1 | * 1/2001 | Dibachi et al. | ............. 381/316 |
| 6,275,596 B1 | * 8/2001 | Fretz et al. | ................. 381/328 |

OTHER PUBLICATIONS

Norris Acoustical Heterodyne™ Technology & HyperSonic™ Sound (Jul. 26, 1997) by Elwood G. Norris of American Technology Group (California) (9 pages).
"In The Audio Spotlight—A Sonar Technique Allows Loudspeakers To Deliver Focused Sound Beams", *Scientific American*, Oct. 1998, pp. 40–41.
"Audio Sound Reproduction Based On Nonlinear Interaction of Acoustic Waves" by Dong Weiguo & Wu Qunli, J. Audio Eng. Soc., vol. 47, No. 7/8 Jul./Aug 1999.
"Human Ultrasonic Speech Perception" by Martin L. Lenhardt et al, *Science* 1991: 253: 82–85.
"Audible Ultrasound For Profound Losses", *The Hearing Review*, Feb. 1998, pp. 28, 30, 32, and 36.
"Nonlinear Tones", *Fundamentals Of Hearing—An Introduction*, William A. Yost, 3d ed., Academic Press, Inc., 1994, pp. 189 to 191.

(List continued on next page.)

*Primary Examiner*—Huyen Le
(74) *Attorney, Agent, or Firm*—Bingham McCutchen LLP; David G. Beck (57) ABSTRACT

The present invention is directed to a communication system wherein ultrasonic signals can be used as carriers to efficiently produce high fidelity, wide audio bandwidth sound. Exemplary embodiments rely on the airborne transport of an inaudible ultrasonic carrier directly into the ear canal of a user, such that the non-linearities within the ear itself can be exploited to demodulate the ultrasonic carrier without producing audible sounds at the input to the user's ear. The non-linearities of the ear itself, in conjunction with the human brain's perception of audible frequencies generated in response to ultrasonic stimulation, are relied upon to detect audio information. The ultrasound-to-audio-sound conversion in the confined volume of the inner ear appears to be constant pressure, as opposed to constant velocity, such that all frequencies of the audio bandwidth (including low frequency bass signals) are produced with comparable sound intensity.

19 Claims, 4 Drawing Sheets

OTHER PUBLICATIONS

"Hair Cells And Hearing Aids", by Charles I. Berlin, Ph.D, Singular Publishing Group, Inc., pp. 11, 57–58.

"Suppression Of Otoacoustic Emissions In Normal Hearing Individuals" Linda J. Hood, Ph.D et al., 126–127.

"MEMS Reshapes Ultrasonic Sensing", *Sensors* Feb., 2000, vol. 17, No. 2, pp. 17–27.

Ladabaum, et.al., 5/98, Surface Micromachined Capacotive Ultrasonic Transducers *IEEE Transactions On Ultrasonics, Ferroelectrics and Frequency Control,* vol. 45, No. 3, pp. 678–690.

Ladabaum, et.al., 5/98 "Miniature Drumheads: Microfabricated Ultrasonic Transducers," *Ultrasonics,* vol. 36, pp. 25–29.

X. Jin, et.al. Mar. 1999, "Fabrication and Characterization of Surface Micromachined Capacitive Ultrasonic Immersion Transducers," *IEEE MEMS,* vol. 8, No. 1, pp 100–114.

"High Quality and Low Complexity Pitch Modulation of Acoustic Signals", Lin, Gang–Janp et al., IEEE (0–7803–2431–5/95), pp 2987–2990.

"Shape Invariant Time–Scale and Pitch Modification of Speech", Quartieri, Thomas F. et al, *IEEE Transactions on Signal Processing,* vol. 40, No. 3, Mar. 1992 (1053–587X/92), pp. 497–510.

"Time–Scale Modification of Speech Based on Short–Time Fourier Analysis", Michael R. Portnoff, *IEEE Transactions On acoustics, Speech, And Signal Processing,* vol. ASSP–20, No. 3, Jun. 1981, pp. 374–390.

"High Quality Time–Scale Modification For Speech", Roucos, Salim et al, IEEE, 1985.

* cited by examiner

METHOD AND DEVICE FOR USING AN ULTRASONIC CARRIER TO PROVIDE WIDE AUDIO BANDWIDTH TRANSDUCTION

BACKGROUND OF THE INVENTION:

1. Field of the Invention:

The present invention relates generally to communication systems, and more particularly, to transducers and transduction methods for reproducing wide audio bandwidth sound using an ultrasonic carrier within a communication system.

2. Background Information:

Communication systems typically operate with transducers that convert audio acoustic signals into electrical signals, and vice versa. The audio acoustic signals are airborne sound pressure waves having frequencies within the bandwidth detectable by the human ear (acoustic signals having frequencies between approximately 20 Hertz (Hz) to 20 kiloHertz (kHz)). Ultrasonic acoustic signals are not output from typical audio circuits because these signals possess frequencies outside the bandwidth detectable by the human ear, and produce inaudible sound pressure waves.

However, communication systems are known wherein ultrasonic signals are used as carrier -signals in the production of audio acoustic signals. These systems typically rely on either: (1) the non-linearities of air to demodulate an audio modulated ultrasonic carrier signal; or (2) rely on bone conduction of ultrasonic signals to create the sensation of audio signals. As such, these systems are ill-suited for or even unable to produce high fidelity sound.

For example, a document entitled "Norris Acoustical Heterodyne™ Technology & HyperSonic™ Sound" (Jul. 26, 1997) by Elwood G. Norris of American Technology Group (California) describes a distributed speaker system wherein the ultrasound transducer superposes an audible signal on an ultrasonic signal of such intensity that airborne audible sound pressure waves, detectable by the human ear, are created. By superposing audible frequencies in the 20 Hz to 20 KHz bandwidth onto an ultrasonic tone, the transducer can be designed to provide uniform audio over a frequency range which constitutes a much smaller percentage of the transducer's center frequency. That is, without the use of an ultrasonic carrier, the total frequency range of the audible bandwidth (i.e., approximately 20 kHz) divided by the lowest frequency in the bandwidth (20 Hz) constitutes a percentage frequency shift from the lowest frequency (20 Hz) to the highest frequency (20 kHz) of 20 kHz/20 Hz, or 100,000%. By superposing this 20 kHz band on an ultrasound carrier in the 200 kHz range, the percentage frequency shift reduces to 20 kHz/200 kHz, or 10%, such that the transducer can be more effectively designed. However, this speaker system requires the use of high intensity output signals because it relies upon the non-linearities of air to demodulate the ultrasonic signals into audible acoustic signals. Thus, efficiencies which are gained in the transducer design are lost in the demodulation.

The Norris document describes transmitting two ultrasound wave trains each having a tone of sufficiently high amplitude that when introduced to the nonlinearity of air in the room produce two "combination" tones corresponding to the sum and difference of the two original ultrasonic tones. For example, if two ultrasonic tones of 200 kHz and 201 kHz were emitted from the ultrasound transducer into air with sufficient energy, a sum tone of 401 kHz and a difference tone of 1 kHz would result, that latter being within the range of human hearing. The distributed speaker system thus relies on the non-linearity of air and the resultant difference tone to produce an audio acoustic signal having pressure waves that can be detected by listeners.

A document entitled "In The Audio Spotlight—A Sonar Technique Allows Loudspeakers To Deliver Focused Sound Beams", *Scientific American*, October. 1998, pp. 40–41, describes the demodulation of audio tones from ultrasonic waves using the non-linearities of air, and discusses the work of Norris. This document mentions the distortion which occurs at low frequencies of the audible bandwidth when audible tones are produced from ultrasonic waves using the non-linearities of air (i.e., poor bass). This document suggests that using the non-linearities of air to demodulate an ultrasonic carrier to produce sonic energy compromises the ability to achieve high fidelity, wide audio bandwidth sound having a full, bass response. Such a compromised ability would be unacceptable for high fidelity communications.

The lack of audio bass in systems which rely on the non-linearity of air to produce sonic energy occurs because the ultrasound-to-audio-sound transformation is essentially constant volume displacement. That is, the volume of air moved is essentially the same no matter what sonic frequency is being converted. However, the human ear is essentially constant pressure. That is, to hear a constant loudness over a range of audible frequencies requires that those frequencies be presented at the same pressure (also called Sound Pressure Level or SPL). In air, volume displacement and pressure are related, as a function of frequency, as $P=V*f$, where P is pressure, V is volume displacement and f is the frequency. Thus, to maintain constant pressure (i.e. SPL) as the audible sonic frequency is reduced, the volume displacement must be proportionally increased. Since the Norris technique does not inherently increase the volume displacement at lower audio frequencies, a proportional increase in the ultrasound drive signal must be used. This is called equalization, and it results in a need for very large drive signals to reproduce flat low bass audio frequencies. However, boosting the lower frequencies can not sufficiently compensate the loss without causing distortion when the transducer is driven hard.

Another document entitled "Audio Sound Reproduction Based On Nonlinear Interaction of Acoustic Waves" by Dong Weiguo and Wu Qunli, J. Audio Eng. Soc., Vol. 47, No. 7/8 1999 July/August also describes the nonlinear interaction of two finite-amplitude sound waves of different ultrasonic frequencies in air to produce audible sound waves whose frequencies correspond to the difference of the primary waves. However, this document describes the difficulty in relying on non-linearities of air, as opposed to fluids, to exploit this effect. This difficulty is due to the high absorption of acoustic waves in air and the small non-linearity parameters of air. As experimentally confirmed by Weiguo, the audio frequency SPL output is indeed proportional to frequency; that is, for a constant ultrasound input, the audio output was 34 dB lower at 20 Hz than at 1 kHz. Furthermore, this inherent effect is the same whether the two ultrasonic frequencies are produced from two different ultrasonic transducers or from a single transducer. Thus, like the *Scientific American document*, this document suggests that using the non-linearities of air to demodulate an ultrasonic carrier compromises the bass response, a result which would be unacceptable for high fidelity communications.

Norris, in U.S. Pat. No. 5,889,870, entitled *Acoustic Heterodyne Device and Method*, describes headsets and hearing aids based upon his acoustical heterodyne method. However, both devices rely upon the non-linearities of the air transmission medium. For example, they rely on the non-linearities of air within the ear canal itself to create airborne audible acoustic waves that are subsequently detected by the normal acoustic hearing process of the ear. Furthermore, the Norris patent discloses that this process requires a resonant cavity, and that the ear canal's natural resonance properties provide that necessary element (col. 15, lines 14–27). There is no mention of a system which does not require the nonlinearities of air nor one which works without the "broadly resonant cavity".

The use of ultrasonic signals is also described in a document entitled "Human Ultrasonic Speech Perception" by Martin L. Lenhardt et al, *Science* 1991: 253: 82–85. However, rather than relying on the non-linearities of air to demodulate an ultrasonic carrier, this document is directed to use of bone-conducted ultrasonic signals. The bone-conducted ultrasonic signals are asserted to have potential as an alternative communication channel in the rehabilitation of hearing disorders.

It is unclear from the Lenhardt document exactly how the ultrasonic signals are converted into detectable sensations. However, Lenhardt discloses tests performed using the two sidebands of a modulated ultrasonic signal. The two sidebands constitute two different ultrasonic frequencies generated using a dual side band (DSB) suppressed carrier modulation method, and are received via bone conduction by the inner ear. Non-linearities of the bone conductor mechanism are presumably used to detect a difference between the two ultrasound sidebands which are spaced at twice the input frequency. Since the two sidebands are spaced from one another by twice the audio frequency used to modulate the ultrasonic carrier, the detectable audio frequencies would be doubled and the natural spacing of speech components would not be preserved. The double sideband suppressed carrier modulation technique diminishes the intelligibility of speech, and renders the Lenhardt approach unsuitable for high fidelity sound.

The reliance of the Lenhardt approach on the non-linearities of the bone conduction mechanism to produce audible sensations is supported in a document by Staab, et al. entitled "Audible Ultrasound For Profound Losses", *The Hearing Review*, Febuary 1998, pages 28–36, which cites the Lenhardt et al document and its disclosed use of an amplitude-modulated, suppressed carrier (double sideband modulated) technique, with speech superposed on the carrier. Page 30 of The *Hearing Review* document describes a HiSonic™ hearing aid device developed by Hearing Innovations Inc. of Tucson, Ariz. as an outgrowth of the Lenhardt et al technology. *The Hearing Review* document indicates on page 30 that in a test where a piezoelectric bone conduction driver was applied directly to the mastoid of the skull, no audio signal was measurable using a force transducer on the mastoid or a probe microphone in the ear canal. Thus, it is concluded that the audible sensations detected did not come from any airborne audio signal but must have resulted from some internal non-linearity in the bone conduction path.

The Lenhardt document does not disclose the use of a transducer with an impedance matched to air, and therefore it is incapable of directing inaudible, airborne ultrasonic signals down the ear canal of a user to produce sound that is detectable by the user. Page 36 of *The Hearing Review* document suggests that the bone conducted ultrasound may directly stimulate a nerve, stimulate the cochlea, or stimulate a secondary auditory pathway. However, the use of bone conduction, coupled with the use of a double sideband suppressed carrier, compromises the fidelity of sound achievable with the device.

In the Lenhardt, et. al. U.S. Pat. Nos. 4,982,434 and 5,047,994, both entitled *Supersonic Bone Conduction Hearing Aid and Method*, it is disclosed that the bone conduction method is based on a system of hearing quite distinct from normal hearing based on air conduction. ('994, col. 1, lines 61–63). Furthermore, in the '434 patent at col. 2, lines 28–38 Lenhardt discloses that his method relies upon direct bone transmission to the saccule and this enables hearing to be maintained via a system independent of air conduction and the inner ear, and utilizes frequencies that are perceived by the saccule and not by the inner ear. Thus, Lenhardt's hearing aid device is based upon the ultrasonic sensitivity of a non-hearing organ.

Additionally, the signal from Lenhardt's bone-conduction ultrasound transducer is coupled to the mastoid region of the head by, for example, applying significant pressure with the transducer or with coupling gel or both. This is because the transducer's acoustic impedance is matched to the impedance of the bone so that good signal transfer can be obtained. The impedance of air is many orders of magnitude lower, so that even a slight separation of the transducer from the head would produce a nearly total dropout of the signal. Thus, the Lenhardt's approach is inconvenient or even painful, especially for long wearing periods.

Furthermore, Lenhardt discusses that his method suffers from an expansion of the Just Noticeable Differences (JND) of frequency. Lenhardt's device therefore includes a frequency expander, the purpose of which is to stretch the spacing of the audio frequencies so that the modulation sidebands can be sensed as separate frequencies ('434, col. 4, line 50 through col. 5, line 2).

Shannon, et. al. in U. S. Pat. No. 5,285,499 entitled *Ultrasonic Frequency Expansion Processor*, further describes this JND problem and references the Lenhardt, et. al. patents. In this Shannon patent, a method for accomplishing frequency expansion is disclosed, based upon digital signal processing methods and specifically utilizing pitch shift processing combined with single-sideband upconversion to generate the bone conduction drive signal. Although the use of digital pitch shifting is disclosed in this document, it is disclosed for overcoming the JND bone conduction problem by expanding the frequencies of the incoming audio signal prior to modulation of the ultrasound signal.

In summary, known communications systems do use inaudible ultrasonic signals to produce sensations that are detectable as sound by the human ear. However, because these systems either rely on the non-linearities of air to demodulate the ultrasound, or rely on bone conduction of ultrasonic signals to create the sensation of audio signals, they cannot provide high fidelity audible sound. In addition, the bone-conduction method is, at best, very uncomfortable in use.

SUMMARY OF THE INVENTION

The present invention is directed to a communication system wherein ultrasonic signals can be used as carriers to efficiently produce high fidelity, wide audio bandwidth sound. Exemplary embodiments rely on the airborne transport of an inaudible ultrasonic carrier directly into the hearing mechanism of a user, such that the known non-linearities within the ear itself can be exploited to demodulate the ultrasonic carrier without producing audible sounds at the input to the user's ear. The non-linearities of the ear itself, in conjunction with the human brain's perception of audible frequencies generated in response to ultrasonic stimulation, are relied upon to detect audio information.

The ultrasound-to-audio-sound conversion in the middle and/or inner ear does not require creation of audible sonic pressure waves in the air, but rather directly converts ultrasound difference frequency pressure into audible pressure. Thus, this conversion is constant pressure and all frequencies of the audio bandwidth (including low frequency bass signals) are produced with comparable sound intensity.

An exemplary communication device of the present invention comprises: means for establishing an ultrasonic signal; means for modulating the ultrasonic signal with an audio signal to produce a modulated ultrasonic signal at an output; and means for mounting the output in proximity to a human ear canal at a location where a hearing mechanism associated with the ear canal receives the audio signal as inaudible airborne ultrasonic acoustic energy.

Modulation techniques are selected which exploit the direct introduction of the modulated ultrasonic signal into the user's ear. For example, modulation techniques such as double sideband with carrier, carrier-plus-single-sideband, and pitch shifting techniques (e.g., pitch shifting techniques combined with modulation which suppresses the carrier) are used.

Exemplary embodiments of the present invention provide significant advantages. For example, where a communication device configured in accordance with the present invention is used as the speaker transducer of an earpiece worn by the user, the output from the speaker transducer can be directed toward the tympanic membrane of the user's ear and, due to the non-linearities of the ear itself, result in perceptible sound to the user. However, since audio acoustic energy is not produced in the air, audio acoustic sound is not radiated from the user's ear. As such, others in the vicinity of the user will hear no sound from the earpiece, thereby providing secure secret communication. This is particularly useful in surveillance or covert operations. Other people near the user will not be annoyed by incoming signal sounds produced by the communication device, even in the most quiet of environments, because audible sounds are not supplied to the user's outer ear.

Other advantages include that this non-contact method provides extreme comfort for long-term usage. This is due to at least two factors: first there is no contact pressure or messy coupling gel required as for the bone-conduction methods and second, because the ear canal is not occluded, as is the case with many earbud and hearing aid sound delivery systems, there is complete lack of the occlusion effect.

Exemplary embodiments can be configured of small size and light weight, such that they are comfortable to wear and yet still achieve the benefits of secrecy and quiet operation. Such features are particularly advantageous where the speaker transducer is included in an earpiece situated within the ear canal such that a portion of the canal remains open (i.e., an open canal earpiece). With an open canal earpiece, the user can, in addition to hearing output signals from the earpiece, also comfortably hear ambient sound in a vicinity of the user.

BRIEF DESCRIPTION OF THE DRAWINGS

Other objects and advantages of the present invention will become apparent to those skilled in the art upon reading the following detailed description of preferred embodiments, in conjunction with the accompanying drawings, wherein like reference numerals have been used to designate like elements, and wherein.

DETAILED DESCRIPTION OF THE PREFERRED EMBODIMENTS

Figure 1:
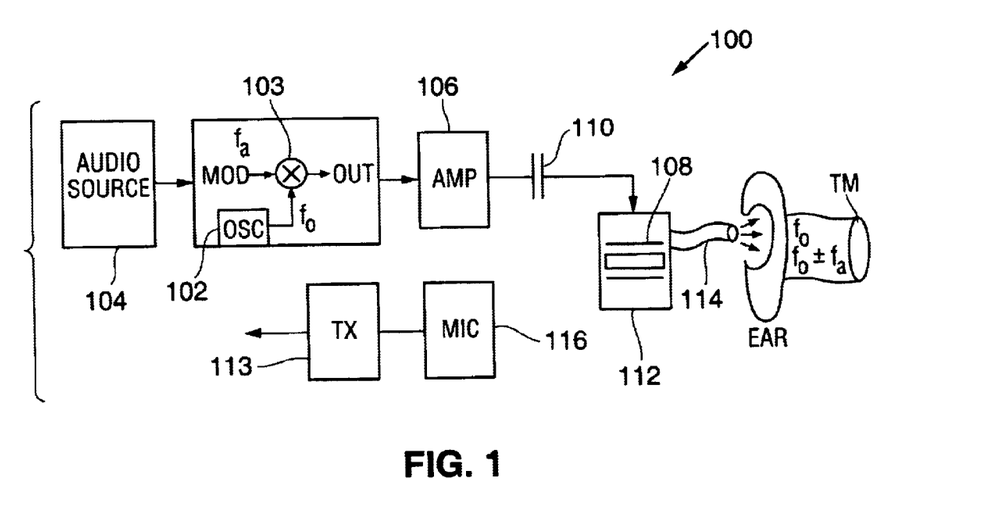
FIG. 1 shows a communication device configured in accordance with an exemplary embodiment of the present invention.

FIG. 1 illustrates an exemplary communication device 100 configured to illustrate principles of the present invention. The FIG. 1 communication device is configured as including a speaker transducer which relies upon the non-linearities of the middle and inner ear (that is, from approximately the tympanic membrane inward) to transform inaudible ultrasonic acoustic energy into audible energy perceptible as sound by a listener. The nonlinear process of the human ear has been described in documents such as "Nonlinear Tones", *Fundamentals Of Hearing—An Introduction*", William A. Yost, 3d ed., Academic Press, Inc., 1994, pp. 189 to 191; and "*Hair Cells And Hearing Aids*", by Charles I. Berlin, Ph.D, Singular Publishing Group, Inc., pp. 11, 57–58 and 126–127 ("Suppression Of Otoacoustic Emissions In Normal Hearing Individuals" Linda J. Hood, Ph.D et al). However, the use of these non-linear processes to demodulate an inaudible modulated ultrasound signal has not been explored.

Referring to FIG. 1, the exemplary communication device 100 as shown can produce high fidelity, wide audio bandwidth sound down to and including frequencies at the lowest end of the perceptible audio frequency range (e.g., down to 20 Hz) while still providing the convenience of an open canal configuration. Because the device does not output audible sound pressure waves to the outer ear of the user, the user wearing the earpiece will hear wide audio bandwidth sound from the earpiece, but others in a vicinity of the user will not hear radiation of sound from the earpiece.

The exemplary FIG. 1 communication device 100 includes a means for establishing an ultrasonic signal, represented as an oscillator 102 (e.g., ultrasonic oscillator) which is to be modulated with the audio acoustic signal. Although the oscillator can be any device capable of producing an ultrasonic signal, in an exemplary embodiment, an HP 6061A radio frequency generator available from Hewlett Packard, which includes such an oscillator, was used in a test setup. The ultrasonic signal can have a predetermined frequency $f_o$ (e.g., on the order of 25 kHz).

The communication device 100 also includes means for modulating the ultrasonic signal with an audio signal $f_a$ from an audio source 104, such as an FM radio, CD player, microphone or any other audio source which receives the audio signal either via a wired link, or via a wireless link. The audio signal is used to modulate the ultrasonic signal via a modulator (e.g., mixer) 103, and to produce a modulated ultrasonic signal at an output. For example, the output can be an amplitude modulated signal.

The modulated ultrasonic signal is supplied to an amplifier 106 (for example, any conventional amplifier configured as part of, or separately from the modulating means). The output from the amplifier is supplied to an output device 108 via, for example, any filter, represented in FIG. 1 as a filter 110 that includes capacitor (e.g., 0.1 micro-farad capacitor for the frequencies mentioned). Although the filter can serve any purpose including, for example, tailoring the frequency response to compensate for a hearing impairment, for simplicity, the filter is shown in FIG. 1 as a high-pass (DC blocking) filter.

The output device 108 is an ultrasonic transducer, or transducers. In accordance with exemplary embodiments, the ultrasonic transducer can be the transducer designated EFF0UB25K2, available from Matsushita Electronic Company of Japan. The ultrasonic transducer can be a resonant device with finite, relatively narrow percentage bandwidth (compared with audio sound transducers). Typical bandwidths are approximately 10% to 20% (or lesser or greater) of the center frequency.

A means for mounting the transducer or transducers is represented as an earpiece 112 that can be located behind the ear (i.e., a behind-the-ear (BTE device) of the user, or can be configured to be placed directly in the ear canal or in any other convenient location near or in a user's ear. Where a behind-the-ear device is used, the ultrasound signals can be conveyed to the ear canal of the user via a tubing 114. Alternately, the mounting means can be configured to place the entire communication device, or any portion thereof (such as the output device 108) within the ear itself (e.g., within the ear canal). In either case, the mounting means is configured to mount an output of the ultrasonic transducer in proximity to a human ear canal at a location where a hearing mechanism associated with the human ear canal receives the audio signal as inaudible airborne ultrasonic energy. As referenced herein, this refers to the ultrasonic transducer or transducers being placed such that their output is directed toward the tympanic membrane (TM) and thus, the middle and inner ear of the user sufficiently to permit non-linearities of the middle and inner ear to convert the difference between two ultrasonic frequencies into audible energy (i.e., audible pressure waves) perceptible by the ear. In one embodiment, the transducer is configured for placement in the ear in a manner whereby a direct line of sight is established between the transducer output and the user's tympanic membrane. Such a feature is particularly useful with an open canal device.

Where the transducer is configured to be placed directly in the ear canal, it can be configured using any suitable technology including piezoelectric transducer or electrostatic transducer technology, and technology as described in a document entitled "MEMS Reshapes Ultrasonic Sensing", *Sensors* February 2000, Vol. 17, No. 2, pp. 17–27, the contents of which are incorporated herein by reference. This document describes a silicon microelectromechanical system (MEMS) built on the surface of a silicon wafer using integrated circuit technology to provide an ultrasonic transducer. Such devices can be manufactured with standard integrated circuit technology at low cost and with high reproducibility. Silicon ultrasonic sensors transfer electrical energy into acoustic energy, and can have lightweight nitride membranes which match the acoustic impedance of air to create pressure waves more efficiently. In addition, these devices can provide unidirectional radiation so the ultrasound signal can be aimed at the tympanic membrane to enhance efficiency and covertness. Typical silicon sensors have a thickness of, for example, less than 1 mm.

Similar devices are described in the following documents which are hereby incorporated by reference: Ladabaum, et.al. May 1998, "Surface Micromachined Capacitive Ultrasonic Transducers," *IEEE Transactions On Ultrasonics, Ferroelectrics and Frequency Control*, Vol. 45, No. 3, pp. 678–690; Ladabaum, et.al. May 1998, "Miniature Drumheads: Microfabricated Ultrasonic Transducers," *Ultrasonics*, Vol. 36, pp. 25–29; and X. Jin, et.al. March 1999, "Fabrication and Characterization of Surface Micromachined Capacitive Ultrasonic Immersion Transducers," IEEE MEMS, Vol. 8, No. 1, pp 100–114.

Exemplary embodiments of the present invention use the non-linearities of the inner and middle ear to permit detection of wide audio bandwidth signals without creating audible sound pressure waves outside the ear. Rather, the inaudible ultrasonic energy, represented as ultrasonic sound pressure waves, is converted to audible energy, in the form of sound pressure waves, via the non-linearities of the user's middle and inner ear mechanism. Efficiencies are therefore very high, because energy is not radiated into space surrounding the ear, but rather goes directly to the sensory hearing mechanism of the ear.

Where the ultrasonic carrier is directed toward the user's tympanic membrane using a transducer placed into the ear canal which completely occludes the ear canal, any escape of the ultrasound to the space surrounding the user's ear is essentially prevented. The ultrasound carrier is received by the tympanic membrane such that high fidelity wide audio bandwidth signals can be produced in accordance with the present invention. However, the present invention can achieve high fidelity, wide audio bandwidth sound even with open canal earpieces.

Those skilled in the art will appreciate that an open, or partially open canal earpiece which only partially, or negligibly, occludes the ear canal is desirable because it allows the user to comfortably hear ambient sounds (for example, someone who is speaking to the user), and yet still hear an output via the earpiece from an additional source (such as an output from a compact disk player or stereo). A behind-the-ear communication device having an open canal earpiece is, for example, described in commonly owned, co-pending U.S. application Ser. No. 08/781,714 , entitled "Open Ear Canal Hearing Aid System", the contents of which are hereby incorporated by. reference in their entirety.

The communication device 100 can also be configured as a two-way communication device, as described for example, in copending U.S. application No. 09/121,208 entitled "Two-Way Communication Earpiece", filed Jul. 22, 1998, the contents of which are incorporated herein by reference. In such an embodiment, the communication device can be further configured to include a transducer, such as a microphone 116 to pick up ambient sound, such as the user's voice, for transmission to a remote location via a wired link (connected, for example, to a sound processing unit worn by the user), or via a wireless link (connected, for example, to the sound processing unit, or to any other remote location including, but not limited to, a cellular telephone network). The communication device can include a separate transmitter 118 for modulating the output of the microphone 116, or can use the modulator 103. The microphone 116 and/or transmitter 118 can be placed either behind the ear, or in the ear canal or in another location near the ear (e.g., on a headset or headband).

Figure 2A:
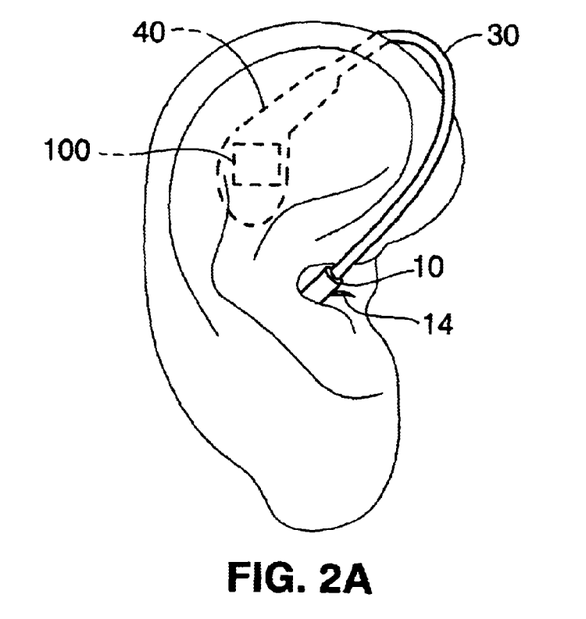
FIGS. 2A and 2B show exemplary mounting of a device configured in accordance with exemplary embodiments of the present invention.
Figure 2B:
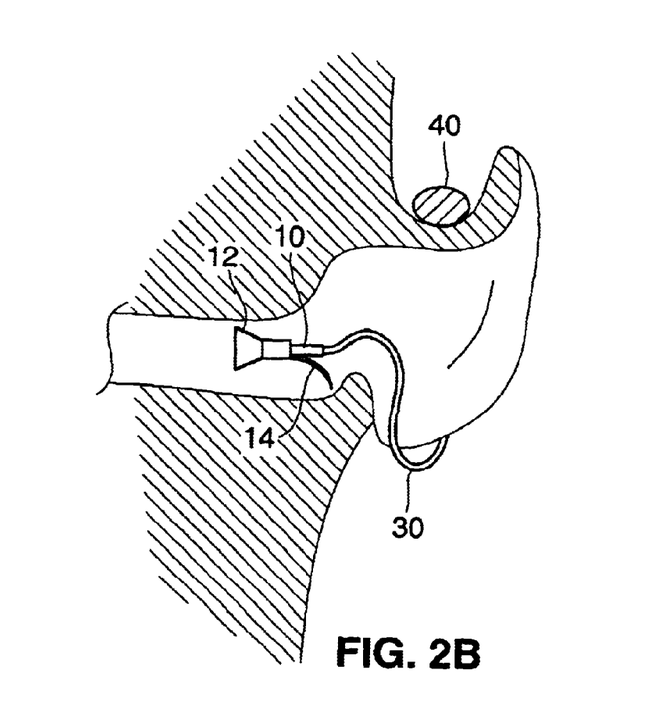

FIGS. 2A and 2B show an exemplary implementation of the FIG. 1 communication device in a behind the ear device which communicates with the ear canal via tubing that, once placed into the ear canal, leaves the canal partially open. In FIG. 2, the tube is a two piece tube having sections 10 and 30, an output section 12, and a barb 14 for holding the tube in the canal. The communication device 100 including the ultrasonic transducer can be retained in a behind the ear mount 40.

Alternately, the ultrasonic transducer can be configured to be placed directly in the ear canal. For example, it can be mounted in the output section 12. Those skilled in the art will appreciate that the ultrasonic transducer can be included in a communication device configured to be directly placed in the entrance to the ear canal of the user using a configuration as described in U.S. Pat. No. 5,761,316 or in co-pending U.S. application Ser. No.09/184,071, entitled "Hearing Aid Communications Device", filed Nov. 2, 1998, the contents of which are hereby incorporated by reference in their entireties. The transducers send ultrasonic signals directly into the ear of the user such that the actual sensation of low frequencies (e.g., on the order of 20 to 1000 Hz) are generated without the need to pressurize large air volumes as is required with traditional sonic methods.

Exemplary embodiments of the modulator can implement the amplitude modulation using any of various modulation techniques including, but not limited to, those which can produce ultrasonic frequency components whose frequency difference is comparable to, and preferably equal to, the audio frequencies of interest (as opposed to being a multiple of the audio frequencies of interest as is the case with double sideband-suppressed carrier modulation, or expanded as is the case with the Lenhardt or Shannon technology). Exemplary modulation techniques include (a) double sideband (DSB) with carrier modulation; (b) carrier-plus-single-sideband modulation; and (c) pitch shifting techniques used in combination with any modulation, including double sideband-suppressed carrier modulation.

In standard DSB- with-carrier modulation, the carrier-to-sideband difference frequency equals the frequency of the original audio signal $f_a$ and, during the demodulation process, the carrier-to-sideband difference dominates over the sideband-to-sideband difference. The residual sideband-to-sideband difference frequency of $2f_a$ is of small amplitude and is merely a distortion artifact. This modulation technique, however requires twice the transducer bandwidth to pass the audio signal, since the transducer must reproduce both sidebands and the carrier; i.e., for a particular audio bandwidth to be properly reproduced, the ultrasound transducer's bandwidth must be twice as great as the audio bandwidth of interest. Thus, a transducer designed to operate over a 10% bandwidth must have a center frequency sufficiently high so that 10% of the center frequency equals twice the desired audio bandwidth. Alternately, a transducer designed for a 20% bandwidth can be used at a carrier frequency of one half of that required for the 10% case. Regardless, the carrier can be fixed at the middle of the transducer's passband.

Figure 3A:
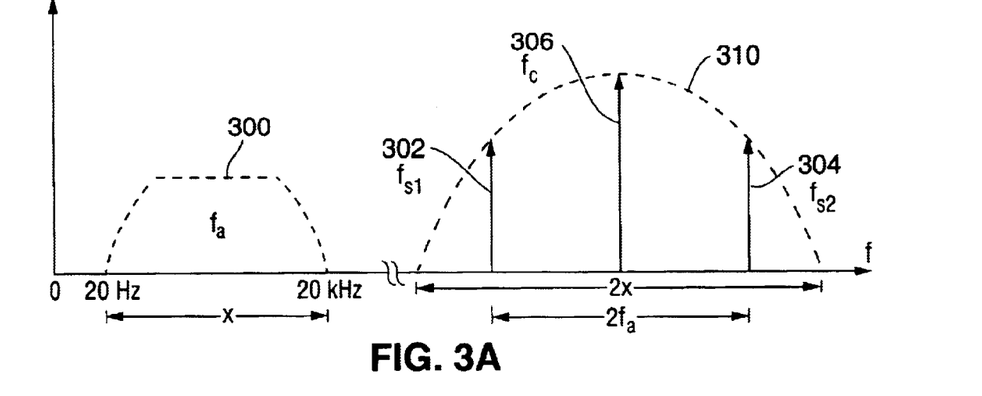
FIGS. 3A, 3B and 3C show exemplary modulation techniques used in accordance with exemplary embodiments of the present invention.

FIG. 3A shows an example of a system spectrum using this modulation. FIG. 3A shows a frequency (f) versus amplitude plot of the spectrum associated with an amplitude modulated ultrasonic carrier using double sideband with carrier. Here, the two frequency sidebands 302 and 304 labeled $f_{s1}, f_{s2}$ each beat with the more intense center frequency 306 labeled $f_c$ such that the carrier-to-sideband beat frequency dominates. The differences in frequency $\Delta f$ between 304 and 306, and between 302 and 306 combined must fit within the transducer bandwidth for the highest audio frequency of interest. Although this method is very simple to implement, it requires twice the transducer bandwidth of the other modulation methods.

The audio bandwidth can, of course, be selected in accordance with the particular application. For example, a typical telecommunications bandwidth is 300Hz to 3 kHz, a typical multimedia bandwidth is 30 Hz to 10 kHz, and a typical high fidelity audio bandwidth is 20 Hz to 20 kHz (as shown). Depending on the desired audio bandwidth 300, the ultrasonic bandwidth can be selected twice as wide where the ultrasound transducer bandwidth is 10% of the center frequency 306 ($f_c$) of the ultrasonic bandwidth. Of course, where the ultrasonic transducer bandwidth is lesser or greater than 10% of the center frequency, the ultrasonic transducer center frequency can be adjusted accordingly to achieve the desired audio bandwidth.

Figure 3B:
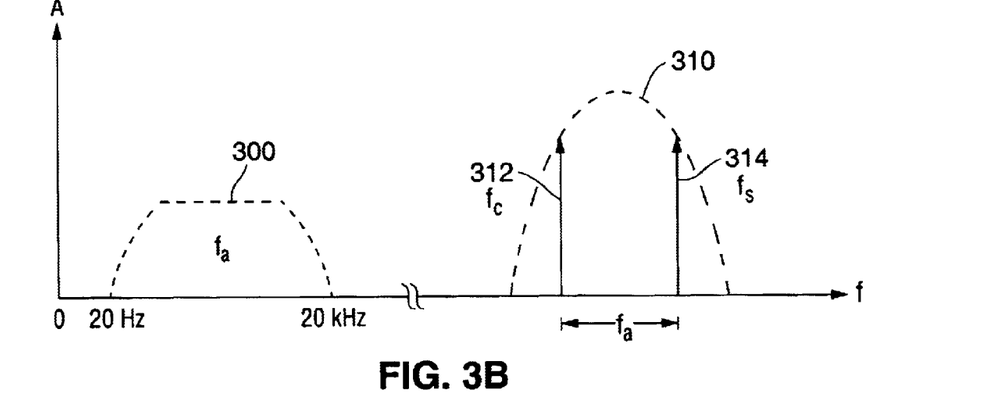

FIG. 3B shows carrier-plus-single-sideband modulation (also known as single sideband with injected carrier modulation), wherein double the audio bandwidth can be achieved for the same ultrasound transducer. However, this modulation requires that the carrier center frequency 312, labeled $f_c$ be placed stationary at one passband edge during modulation, with distortion-caused by the sideband amplitude varying with frequency due to the transducer passband not being flat. The single sideband 314 moves back and forth along the frequency axis, between the band edges, with the modulation. This modulation is similar to the double sideband modulation discussed above, but where one sideband is removed by filtering or other conventional modulation means well known in the art for creating single-sideband modulation. If the carrier is placed at one band edge and the upper sideband is used, as is shown in FIG. 3B, then the carrier frequency is placed near the lower band edge. Alternately, the lower sideband can be used and the carrier is then placed near the upper band edge of the transducer's passband.

Alternately, the carrier can be variable so that the carrier-plus-sideband energy is centered. However, this involves using an intelligent, variable carrier modulation method. The carrier frequency is moved dynamically so that the entire carrier-plus-sideband energy is always centered on the transducer passband. In all cases, the frequency difference $\Delta f$ between the carrier 312 and the sideband 314 is substantially equal to the audio frequency $f_a$.

Because this modulation method requires one half of the passband bandwidth as compared to the double-sideband method discussed in reference to FIG. 3A, a transducer with the same percentage bandwidth can be used at one half the center frequency. This method does not create the residual sideband-to-sideband distortion output at twice the e audio frequency. However, because the passband of ultrasound transducers is not perfectly flat, the loudness of the perceived output can vary in an abnormal manner with the audio frequency being reproduced. Typically low and high audio frequencies can be attenuated, while central audio frequencies are enhanced. This can be quite beneficial for telephony and other voice communication applications, but is undesirable for high fidelity applications.

Figure 3C:
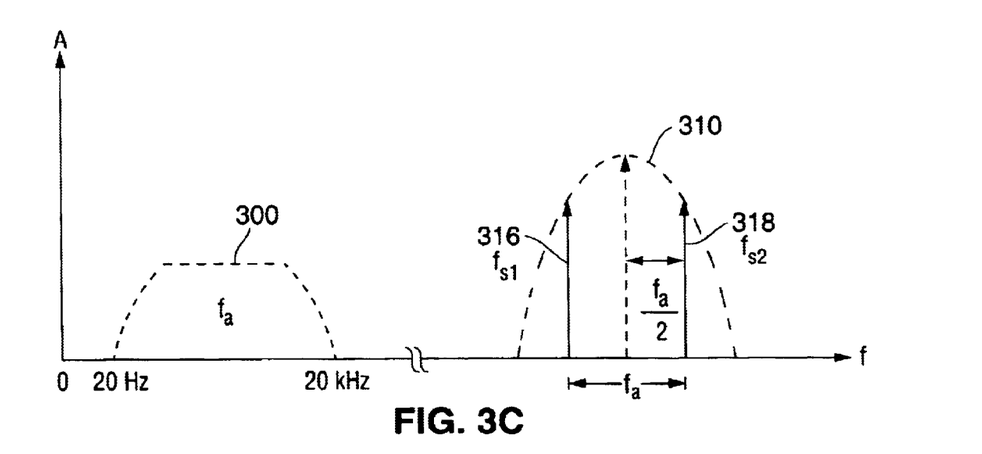

FIG. 3C shows a modulation method which incorporates the use of pitch-shift methods. FIG. 3C shows use of pitch shift with double sideband, suppressed carrier modulation, where the two frequencies designated 316 and 318 correspond to two sidebands separated by $f_a$. By selecting the percentage pitch shift such that pitch shifted frequencies of the pitch shifted audio signal are less than or equal to 100% of their original audio frequencies and, for example, substantially near 50%, all frequencies in the audio signal can be reduced to some proportionally lower frequency than that of their original frequency without changing the time parameters of the audio signal. When reduced to one half of their original frequency ( i.e., a 50% pitch shift) the bandwidth labeled 310 of the ultrasonic transducer can again be maintained equal that of the audio bandwidth 300, even for a transducer operable over a more narrow 10% frequency shift. That is, as compared to the double-sideband method shown in FIG. 3A, this technique reduces by half the ultrasonic bandwidth necessary to achieve a desired audio bandwidth, so that similar to the method shown in FIG. 3B, a narrower bandwidth transducer can be used. With this method, both of the sidebands 316 and 318 move equally and symmetrically along the frequency axis with the frequency modulation of $f_a$.

Pitch shifting the original audio to, for example, one half the pitch and then using this "new" audio to modulate with double sideband, suppressed carrier keeps a single fixed carrier frequency centered on the transducer passband while maintaining the difference in frequency between the two sidebands equal to the original audio frequency. Such an implementation achieves optimum audio bandwidth and minimum distortion due to transducer "unflatness".

Figure 4:
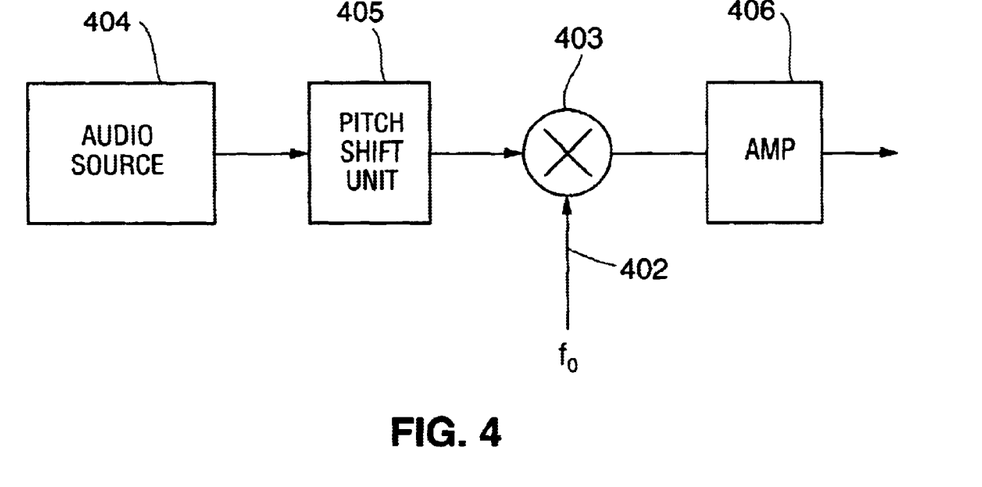
FIGS. 4 and 5 show yet other embodiments of a communication device configured in accordance with the present invention.

FIG. 4 shows an exemplary embodiment of a communication device configured to implement a pitch shift modulation. The FIG. 4 device includes means for producing an ultrasonic signal represented as an oscillator signal 402, an audio signal source 404, and a means for introducing a pitch shift represented as pitch shift unit 405. Real-time pitch shifting techniques are well known in the art and examples are described in the following documents, each of which is incorporated herein by reference: "High Quality and Low Complexity Pitch Modulation of Acoustic Signals", Lin, Gang-Janp et al., IEEE (0-7803-2431-5/95), pp 2987–2990; "Shape Invariant Time-Scale and Pitch Modification of Speech", Quatieri, Thomas F. et al, *IEEE Transactions on Signal Processing*, Vol. 40, No. 3, March 1992 (1053-587X/92), pp. 497–510; "Time-Scale Modification of Speech Based on Short-Time Fourier Analysis", Michael R. Portnoff, *IEEE Transactions On acoustics, Speech And Signal Processing*, Vol. ASSP-20, No. 3, June 1981, pp. 374–390; and "High Quality Time-Scale Modification For Speech", Roucos, Salim et al, IEEE, 1985.

The output of pitch shift unit 405 is supplied to means for modulating the ultrasonic signal, represented as modulator 403, along with the oscillator signal 402. The modulator 403 can, for example, use a DSB-suppressed carrier modulation technique as described with respect to FIG. 3C. The output of modulator 403 is a modulated ultrasonic signal (e.g., amplitude modulated) that can be amplified in amplifier 406, and supplied as an output of the FIG. 1 communication device.

Figure 5:
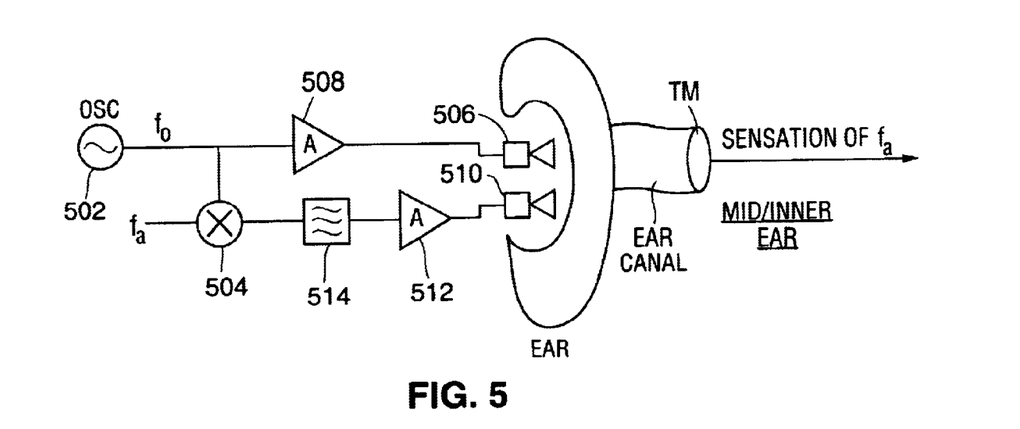

FIG. 5 shows another embodiment of the present invention wherein the previously described use of modulation to produce two dominant ultrasonic frequencies (from which $f_a$ is demodulated) is replaced by the use of two separate and distinct ultrasonic sources. In FIG. 5, an oscillator 502 produces an ultrasonic signal having an ultrasonic frequency labeled $f_0$. An audio signal having a frequency $f_a$ is also provided. The oscillator constitutes a means for producing an ultrasonic signal that is modulated by an audio signal in a modulating means represented as a mixer 504. An output device is represented as an ultrasonic transducer 506 which produces the ultrasonic carrier frequency $f_0$ via an amplifier 508. The output device also includes a second ultrasonic transducer 510 which produces an output at a frequency of the ultrasonic signal which has been frequency offset with the audio signal via frequency offset block 504, an amplifier 512 and a filter 514.

In an alternate embodiment, the mixer 504 can be replaced by any device which can achieve similar functionality. For example, in one embodiment, a separate free running oscillator, such as a voltage controlled oscillator, can be used whose frequency output is offset by a voltage that is a function of the audio signal, the voltage controlled oscillator being synchronized to the oscillator signal output of oscillator 502. Alternately, an oscillator, such as a voltage controlled oscillator, which is phase-locked in frequency with the oscillator 502 can be used to produce an output frequency having a frequency offset by an amount which is a function of the audio signal. Those skilled in the art will appreciate that both voltage controlled oscillators and phase locked loops are well known and readily available.

The transducers 506 and 510, along with any other desired components, can be mounted in a mounting means, such as an earpiece, such that outputs from the transducers are in proximity to a human ear at a location where the hearing mechanism of the human ear receives the signal as inaudible airborne ultrasonic acoustic energy. Again, placement of the mounting means in proximity to the human ear refers to placement of the transducers such that their output is directed toward the tympanic membrane of the user sufficiently to permit the non-linearities of the middle and/or inner ear to convert the ultrasonic signals into perceptible acoustic energy (i.e., audible pressure waves) within the hearing mechanism itself. In alternate embodiments, the FIG. 5 carrier and carrier-offset output signals can be added electrically before amplification and transduction, such that a single transducer can be used as discussed with respect to FIG. 1.

In exemplary embodiments, the ultrasonic frequency can be any desired ultrasonic frequency including frequencies on the order of 30 kHz or other inaudible ultrasonic carrier frequencies below or above this value.

Exemplary embodiments can reproduce low audio frequencies on the order of 20 Hz with an open ear canal, such that noise cancellation can be performed directly in the ear (i.e., the middle and inner ear), canceling very low noise frequencies without requiring high power or enclosed headset drivers. Exemplary embodiments can also be used to produce outputs from any audio acoustic source, including, but not limited to sources wirelessly linked to the earpiece. Exemplary embodiments can be used to provide stereo or binaural listening or hearing through the use of two devices, one at each ear.

Because the communication device outputs inaudible pressure waves, there is no or very little audio frequency vibration of the tympanic membrane (with the exception possibly of reflected sound from the inner ear toward the tympanic membrane). As such, there is no radiation of audible sound pressure waves from the ear, even when the device is used in an open canal or partially open canal configuration.

Exemplary embodiments can be incorporated in a communication device used merely as a conduit for audio information to the user. However, those skilled in the art will appreciate that the present invention can also be applied to hearing aid technology, and used to supply amplified audio information from any source to the inner ear of the user. For example, the communication device of the present invention can be incorporated as a portion of the sound processor in a conventional hearing aid device.

In many applications, and in particular hearing aid and communication applications, it is advantageous to provide environmental sound or user's voice pickup via a microphone pickup location within the ear canal. Such a microphone pickup system is described in co-owned U.S. Pat. No. 5,987,146 Ear Canal Microphone. In the prior art, an audio feedback difficulty arises when the device is configured as a two-way communication device utilizing standard audio acoustic sound delivery. Although half-duplex operation or feedback suppression sound processing can be used to mitigate the problem, substantial limitations are created by these solutions. Use of this invention for providing the "sound" delivery portion of the system solves the feedback problem with no drawbacks, because the microphone is only sensitive to audio frequency sonic signals, while the inventive sound delivery system only delivers inaudible ultrasonic signals to the ear. Since the microphone is not sensitive to these signals, no feedback can occur, and full-duplex operation is easily achieved, even, for example, at the high gain levels required of a hearing aid which addresses severe to profound hearing impairments.

Furthermore, the present invention, especially when configured as an open-canal sound delivery system, allows environmental sounds also to be heard normally and in addition to the delivered signal. Thus, a hands-free headset utilizing the present invention can be used with communications systems where safety is an important or necessary requirement. For example, use of such a headset with a cellular telephone while driving an automobile will not impair the driver's ability to hear important internal and external sounds required for the safe operation of the vehicle.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A communication device comprising:
   means for producing an ultrasonic signal;
   means for modulating the ultrasonic signal with an audio signal to produce a modulated ultrasonic signal at an output; and
   means for mounting the output in proximity to a human ear canal at a location where a hearing mechanism associated with the human ear canal receives the audio signal as inaudible airborne ultrasonic acoustic energy, wherein
      a difference between the frequency of the ultrasonic signal and the frequency of a sideband to the ultrasonic signal is substantially equal to an integer multiple of one-half of the frequency of the audio signal.

2. The communication device according to claim 1, wherein the mounting means is configured to direct the ultrasonic acoustic energy along a line of sight to a tympanic membrane of a user.

3. The communication device according to claim 1, wherein the mounting means includes:
   a tube for placement into said ear canal to direct the ultrasonic acoustic energy into said ear canal.

4. The communication device according to claim 3, wherein said tube leaves the ear canal partially open.

5. The communication device according to claim 1, wherein the mounting means is used to place the device within the ear canal.

6. The communication device according to claim 1, wherein the mounting means comprises:
   a transducer configured as a microelectromechanical system.

7. The communication device according to claim 6, wherein the transducer operates over a frequency bandwidth that is 10% of its center frequency.

8. The communication device according to claim 1, wherein the ultrasonic signal is modulated using double sideband with carrier modulation.

9. The communication device according to claim 1, wherein the ultrasonic signal is modulated using carrier plus single-sideband modulation.

10. The communication device according to claim 1, wherein the ultrasonic signal is modulated using a pitch shifted audio signal, wherein pitch shifted frequencies of the pitch shifted audio signal are less than or equal to 100% of their original audio frequencies.

11. The communication device according to claim 10, wherein the ultrasonic signal is modulated with the pitch shifted audio signal using double sideband, suppressed carrier modulation.

12. The communication device according to claim 1, wherein the ultrasonic signal and the modulated ultrasonic signal are supplied as separate outputs of the communication device.

13. The communication device according to claim 1, configured as a portion of a sound processor in a hearing aid device.

14. The communication device according to claim 1, configured for two-way communications, comprising:
   a microphone for transducing audible sound into electrical signals for transmission to a remote location.

15. The communication device according to claim 1, wherein the integer multiple is one.

16. The communication device according to claim 1, wherein the integer multiple is two.

17. A method for communicating audible sound, comprising the steps of:
   producing an ultrasonic signal;
   modulating the ultrasonic signal with an audio signal to produce a modulated ultrasonic signal at an output, the ultrasonic signal being modulated so that a difference between the frequency of the ultrasonic signal and the frequency of a sideband to the ultrasonic signal is substantially equal to an integer multiple of one-half of the frequency of the audio signal; and
   directing the output in proximity to a human ear canal at a location where a hearing mechanism associated with the human ear receives the audio signal as inaudible airborne ultrasonic acoustic energy.

18. The method for communicating audible sound according to claim 17, wherein the integer multiple is one.

19. The method for communicating audible sound according to claim 17, wherein integer multiple is two.

* * * * *

UNITED STATES PATENT AND TRADEMARK OFFICE
CERTIFICATE OF CORRECTION

PATENT NO. : 6,631,196 B1
DATED : October 7, 2003
INVENTOR(S) : Taenzer et al.

It is certified that error appears in the above-identified patent and that said Letters Patent is hereby corrected as shown below:

Title page,
Item [73], Assignees, the following should be added to read:
-- GN Resound North America Corporation, Redwood City, California --.

Signed and Sealed this

First Day of March, 2005

JON W. DUDAS
*Director of the United States Patent and Trademark Office*